US008929529B2

(12) United States Patent
Beerse et al.

(10) Patent No.: US 8,929,529 B2
(45) Date of Patent: Jan. 6, 2015

(54) MANAGING VOICE COLLISION IN MULTI-PARTY COMMUNICATIONS

(75) Inventors: Chelsea Christine Beerse, Fairport, NY (US); Patrick Joseph O'Sullivan, Ballsbridge (IE); Jeffrey B. Sloyer, Fisherville, VA (US); Carol Sue Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 13/537,306

(22) Filed: Jun. 29, 2012

(65) Prior Publication Data

US 2014/0003595 A1     Jan. 2, 2014

(51) Int. Cl.
*H04M 3/42*     (2006.01)
*H04M 3/56*     (2006.01)

(52) U.S. Cl.
USPC ...................................... 379/202.01; 455/416

(58) Field of Classification Search
CPC ....... H04M 3/56; H04M 3/568; H04M 3/564; H04M 3/563; H04M 2250/62; H04M 2207/18; H04L 12/1818; H04W 4/06

USPC ......................... 379/201.02, 202.01; 455/416
See application file for complete search history.

(56) References Cited

U.S. PATENT DOCUMENTS

| 7,974,422 | B1 | 7/2011 | Ho et al. |
| 2008/0037580 | A1 | 2/2008 | Shaffer et al. |
| 2009/0060157 | A1 | 3/2009 | Kim et al. |
| 2009/0220064 | A1* | 9/2009 | Gorti et al. ............... 379/202.01 |
| 2011/0044474 | A1 | 2/2011 | Grover et al. |

* cited by examiner

*Primary Examiner* — Rasha Al Aubaidi
(74) *Attorney, Agent, or Firm* — Holland & Knight LLP; Brian J. Colandreo, Esq.; Jeffrey T. Placker, Esq.

(57) ABSTRACT

Systems and methods for managing voice collision in multi-party communications are generally provided. Embodiments herein may include identifying a voice collision between a first speaker and a second speaker in a multi-party call. One or more voice collision rules may be received. One of the first speaker and the second speaker to be determined to be a priority speaker based upon, at least in part, the one or more voice collision rules. Call bandwidth may be allocated to the priority speaker.

21 Claims, 2 Drawing Sheets

MANAGING VOICE COLLISION IN MULTI-PARTY COMMUNICATIONS

BACKGROUND

The present disclosure generally relates to electronic communication systems, and more particularly to managing voice collision in multi-party communications.

Individuals in large organizations may often be located in multiple geographic regions. Various collaboration and communication systems may be used for interactions between individuals in different regions. Such communications systems may include unified telephony systems, Voice-over-IP systems, video conferencing systems and the like. Such communications systems may allow individuals to collaborate and work together on projects and the like even though the individuals may be in geographically dispersed locations.

BRIEF SUMMARY

In one implementation, a method may include identifying a voice collision between a first speaker and a second speaker in a multi-party call. The method may also include receiving one or more voice collision rules. The method may also include determining one of the first speaker and the second speaker to be a priority speaker based upon, at least in part, the one or more voice collision rules. The method may further include allocating call bandwidth to the priority speaker.

One or more of the following features may be included. The method may further include determining an identity of the first speaker and an identity of the second speaker. The one or more voice collision rules may be based on, at least in part, an organizational structure. The one or more voice collision rules may be based on, at least in part, speaker subject matter knowledge. The method may further include determining a topic associated with the multi-party call. The one or more voice collision rules may be based on a speaker history.

Determining one of the first speaker and the second speaker as a priority speaker may include determining one of the first speaker and the second speaker as a priority speaker for a first call participant subset. Allocating call bandwidth to the priority speaker may include allocating call bandwidth to the priority speaker for the first call participant subset.

In another implementation, a computer program product may include a non-transitory computer readable medium having a plurality of instructions stored on it. When executed by a processor, the instructions may cause the processor to perform operations including identifying a voice collision between a first speaker and a second speaker in a multi-party call. Instructions may also be included for receiving one or more voice collision rules. Instructions may also be included for determining one of the first speaker and the second speaker to be a priority speaker based upon, at least in part, the one or more voice collision rules. Instructions may further be included for allocating call bandwidth to the priority speaker.

One or more of the following features may be included. Instructions may also be included for determining an identity of the first speaker and an identity of the second speaker. The one or more voice collision rules may be based on, at least in part, an organizational structure. The one or more voice collision rules may be based on, at least in part, speaker subject matter knowledge. Instructions may also be included for determining a topic associated with the multi-party call. The one or more voice collision rules may be based on a speaker history.

The instructions for determining one of the first speaker and the second speaker as a priority speaker may include instructions for determining one of the first speaker and the second speaker as a priority speaker for a first call participant subset. The instructions for allocating call bandwidth to the priority speaker may include instructions for allocating call bandwidth to the priority speaker for the first call participant subset.

According to yet another implementation, a computing system may include one or more processors. The one or more processors may be configured to identify a voice collision between a first speaker and a second speaker in a multi-party call. The one or more processors may also be configured to receive one or more voice collision rules. The one or more processors may also be configured to determine one of the first speaker and the second speaker to be a priority speaker based upon, at least in part, the one or more voice collision rules. The one or more processors may be further configured to allocate call bandwidth to the priority speaker.

One or more of the following features may be included. The one or more processors may be further configured to determine an identity of the first speaker and an identity of the second speaker. The one or more voice collision rules may be based on, at least in part, an organizational structure. The one or more voice collision rules may be based on, at least in part, speaker subject matter knowledge. The one or more processors may be further configured to determine a topic associated with the multi-party call. The one or more voice collision rules may be based on a speaker history.

The one or more processors configured to determine one of the first speaker and the second speaker as a priority speaker may be configured to determine one of the first speaker and the second speaker as a priority speaker for a first call participant subset. The one or more processors configured to allocate call bandwidth to the priority speaker may be configured to allocate call bandwidth to the priority speaker for the first call participant subset.

The details of one or more implementations are set forth in the accompanying drawings and the description below. Other features and advantages will become apparent from the description, the drawings, and the claims.

DETAILED DESCRIPTION

Figure 1:
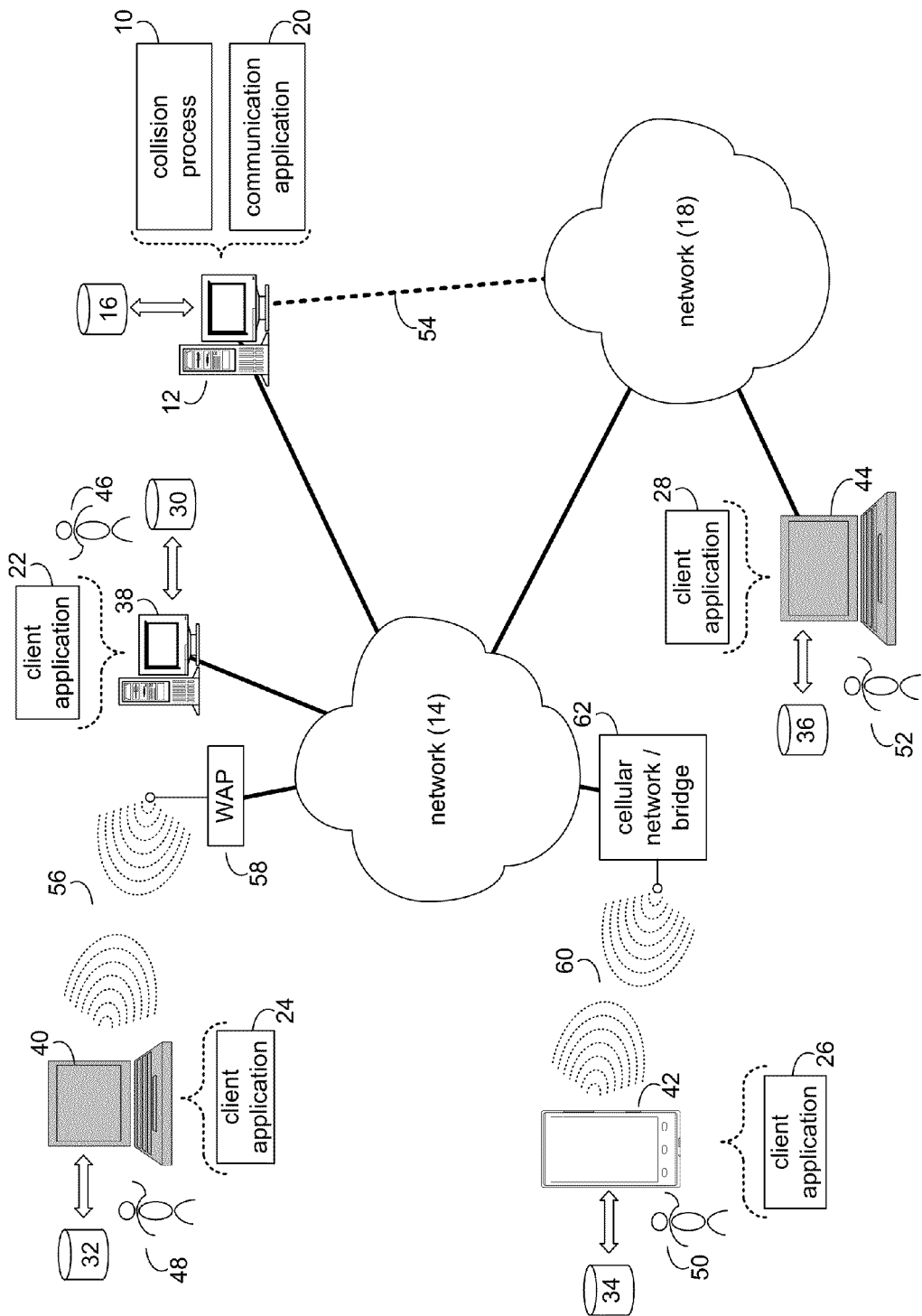
FIG. 1 diagrammatically depicts a collision process coupled to a distributed computing network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium (also herein referred to as a computer readable medium and/or a storage device associated with a computing device or client electronic device) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable or computer-readable medium may be any non-transitory medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages, and/or in scripting languages such as JavaScript programming language or the Groovy programming language. Furthermore, various application programming interfaces (APIs) and/or application development frameworks such as the Dojo or Grails development frameworks may be used in writing the computer program. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown collision process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

As will be described in greater detail below, according to an example embodiment collision process 10 may identify a voice collision between a first speaker and a second speaker in a multi-party call. Collision process 10 may also receive one or more voice collision rules. Collision process 10 may also determine one of the first speaker and the second speaker to be a priority speaker based upon, at least in part, the one or more voice collision rules. Collision process 10 may further allocate call bandwidth to the priority speaker.

The instruction sets and subroutines of collision process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM).

Server computer 12 may execute a web server application, examples of which may include but are not limited to: Microsoft IIS, Novell Webserver™, or Apache® HTTP Server, Apache® Tomcat® application server, that allows for access to server computer (e.g., via network 14) using one or more protocols, examples of which may include but are not limited to HTTP (i.e., HyperText Transfer Protocol), SIP (i.e., session initiation protocol), and the Lotus® Sametime® VP protocol, or other suitable protocol. (Webserver is a trademark of Novell Corporation in the United States, other countries, or both; and Apache and Tomcat are registered trademarks of Apache Software Foundation in the United States, other countries, or both; Lotus and Sametime are registered trademarks of International Business Machine Corporation in the United States other countries, or both). Network 14 may be connected to one or more secondary networks (e.g., network 18), examples of which may include but are not limited to: a local area network; a wide area network; or an intranet, for example.

Server computer 12 may execute communication application (e.g., communication application 20), examples of which may include, but are not limited to, a unified telephony application (e.g., Lotus Sametime® Unified Telephony; Lotus and Sametime are both trademarks of International Business Machines Corporation in the United States, other countries, or both), a Voice-over-IP communication system, a video conferencing system a PBX system, and/or another communication system that may provided communications between at least two parties, in which the communication may include an audio or voice component. The instruction sets and subroutines of communication application 20 may be stored on storage device 16 coupled to server computer 12, and may be executed by one or more processors (not shown) and one or more memory architectures (not shown) incorporated into server computer 12. Communication application 20 may allow for audio and/or audio-video communications between client applications (e.g., client applications 22, 24, 26, 28) in which the communication may include an audio and/or voice component. Accordingly, in an example embodiment, communication application 20 may facilitate communications between two or more participants to communicate using a variety of devices, for example, cellular phones, fixed line phones and/or computers or computing devices. Examples of client applications 22, 24, 26, 28 may include, but are not limited to, a unified telephony application (e.g., Lotus Sametime), a Voice-over-IP application, a video conferencing application, a web browser, and/or another general purpose application and/or special purpose communication application that may allow for communication between two or more participants.

Collision process 10 may interface and/or interact with communication application 20, and/or may be a module or component of communication application 20. In addition/as an alternative to being a server-side process, the collision process may be a client-side process (not shown) that may reside on a client electronic device (described below) and may interact with, and/or may be a module or component of, a client application (e.g., one or more of client applications 22, 24, 26, 28). Further, the collision process may be a hybrid server-side/client-side process that may interact with server-side communication application and a client application (e.g., one or more of client applications 22, 24, 26, 28). As such, the collision process may reside, in whole, or in part, on server computer 12 and/or one or more client electronic devices.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, tablet computer or the like), notebook computer 44, for example. Each of client electronic devices 38, 40, 42, 44 may execute an appropriate operating system, for example, Mac OS, iOS, Android OS, Windows, or other suitable operating system. (Mac OS is a trademark of Apple Inc. in the United States, other countries, or both; iOS is a trademark of Cisco Systems, Inc.; Android is a trademark of Google Inc. in the United States, other countries, or both; Windows is a trademark of Microsoft Corporation in the United Sates, other countries, or both.)

Using client applications 22, 24, 26, 28, users 46, 48, 50, 52 may access collision process 10 and may e.g., manage voice collisions in multi-party communications. Users 46, 48, 50, 52 may access collision process 10 directly through the device on which the client application (e.g., client applications 22, 24, 26, 28) is executed, namely client electronic devices 38, 40, 42, 44, for example. Users 46, 48, 50, 52 may access collision process 10 directly through network 14 or through secondary network 18. Further, server computer 12 (i.e., the computer that executes collision process 10) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Mobile computing device 42 is shown wirelessly coupled to network 14 via wireless communication channel 60 established between mobile computing device 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Figure 2:
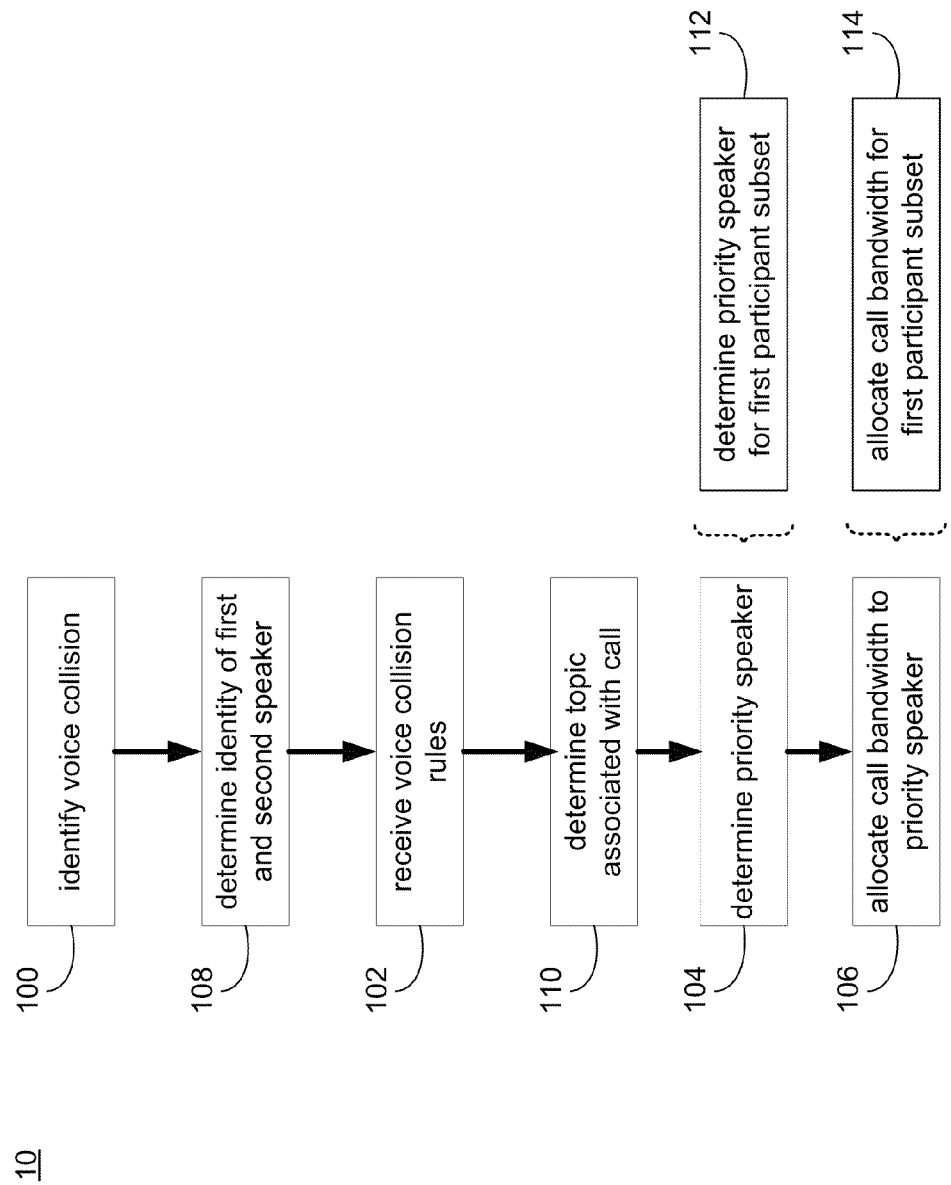
FIG. 2 is a flowchart of a process that may be executed by the collision process of FIG. 1.

Referring also to FIG. 2, according to one aspect, collision process 10 may identify 100 a voice collision between a first speaker and a second speaker in a multi-party call. Collision process 10 may also receive 102 one or more voice collision rules. Collision process 10 may also determine 104 one of the first speaker and the second speaker to be a priority speaker based upon, at least in part, the one or more voice collision rules. Collision process 10 may further allocate 106 call bandwidth to the priority speaker.

For example, during a multi-party call, such as a conference call, more than one individual participating in the call may speak at the same time, giving rise to voice collision between a first speaker and a second speaker (and/or additional individuals speaking at the same time). In such a situation, the various individuals speaking at the same time may make it difficult for other participants of the call to understand any of the individuals speaking and/or one of individuals speaking may be heard by other participants of the call while another of the individuals speaking may not be heard at all (and/or not in an understandable manner) by other participants of the call. In an embodiment of collision process 10 may identify 100 a voice collision between a first speaker and a second speaker in a multi-party call. For example, collision process 10 may identify a voice collision between a first speaker (e.g., user 46) and a second speaker (e.g., user 48) based on, at least in part, transmitted audio (and/or transmitted audio above a threshold volume, or the like) from two or more client applications (e.g., respective client applications 22 and 24 via which users 46 and 48 may participate in the multi-party call).

In an example embodiment, collision process 10 may determine 108 an identity of the first speaker and an identity of the second speaker giving rise to the voice collision. As discussed, in an embodiment, collision process 10 may identify 100 a voice collision based on, at least in part, transmitted audio (e.g., which may be received, forwarded, or otherwise managed by communication application 20 and/or collision process 20) from two or more client applications. In an embodiment, collision process 10 may determine 108 an identity of the first speaker and an identity of the second speaker based on, at least in part, the client application and/or computing device associated with each speaker. Continuing with the above example in which the voice collision may occur between user 46 and user 48, collision process may determine an identity of user 46 and/or of user 48 based by identifying client application 22 (and/or computing device 38) associated with user 46 and/or client application 24 (and/or computing device 40) associated with user 48. In some embodiments, identifying the client application and/or computing device associated with a user may include determining a network attribute (IP address, MAC address, etc.) associated with the client application and/or the computing device. In another embodiment, collision process 10 may determine 108 an identity of one or more of the first speaker and of the second speaker based on an participant code, or other credential, utilized by the user to participate in the multi-party call.

Collision process 10 may also receive 102 one or more voice collision rules. In an embodiment, receiving 102 the one or more voice collision rules may include accessing previously defined voice collision rules (e.g., which may be stored on storage device 16, and/or another storage device). The one or more voice collision rules may be defined, for example, by one or more of a system administrator, a call moderator, default rules, or the like. In some embodiments, the one or more voice collision rules may include generic rules that may be, for example, utilized in connection with all multi-party calls managed by communication application 20 and/or collision process 10. In another embodiment, the one or more voice collision rules may be specific to a particular multi-party call, a particular participant and/or participant set, a particular project or topic, etc. In some embodiments, one or more predefined voice collision rules and/or rules sets may be selected (e.g., by a system administrator, call moderator, or other individual) relative to a give call (e.g., as part of a call scheduling activity, as part of a call set-up or initiation activity, and/or at another time).

In an example embodiment, the one or more voice collision rules may be based on, at least in part, an organization structure. For example, the multi-party call may include one or more individuals associated with an organization such as business entity, a governmental entity, an educational entity, or the like. Such entities may include organizational structures, e.g., based on which the various participants of the multi-party call may reside in an organizational hierarchy. For example, a department head may reside at a higher level in an organizational hierarchy than a team leader, etc. In an embodiment, the organizational structure and/or hierarchical level of each of the participants in the multi-party call (e.g., first speaker, user 46, and second speaker, user 48) may be determined based on an organizational directory (e.g., an LDAP directory) or the like. In an embodiment, an LDAP directory, which may identify a hierarchical position of the first speaker and of the second speaker, may be stored on storage device 16, for example.

In an example in which the one or more voice collision rules may be based on, at least in part, an organizational structure, the one or more voice collision rules may define a speaking priority based on the organizational structure. For example, a voice collision rule may be defined whereby speaking priority may be given to the speaker having a higher hierarchical position relative to the other speaker. In addition/as an alternative to speaking priority being based on hierarchical position, the one or more voice collision rules may also be based on, at least in part, other attributes of an organizational structure, such as the departments with which the first and second speakers are respectively associated, respective titles of the first and second speakers, and the like. Various additional and/or alternative voice collision rules may be defined.

In an embodiment, the one or more voice collision rules may be based on, at least in part, speaker subject matter knowledge. For example, a voice collision rule may define speaking priority based on the relative knowledge of the first speaker and the second speaker relative to the subject matter being discussed. In such an embodiment, collision process 10 may determine 110 a topic associated with the multi-party call. Collision process 10 may, for example, determine 110 a topic associated with a multi-party call based on, at least in part, information associated with the call as part of call scheduling and/or call set-up and/or based on other information (e.g., a user input indicative of a call topic). Further, collision process may determine a call participant (e.g., who may be a speaker involved in a voice collision) to have subject matter knowledge based on an explicit indication of subject matter knowledge relating to the topic of the call. For example, subject matter knowledge of the participant may be defined (e.g., based on a user input) during scheduling or set-up of the call. In some embodiments, collision process 10 may determine subject matter knowledge of a participant based on implicit indication of subject matter knowledge. For example, collision process 10 may determine 110 a topic associated with a call (e.g., a topic of the call is product A) based on a subject included with an invitation to the call (e.g., in a calendaring/scheduling application). Collision process 10 may further determine that user 46 has subject matter knowledge pertaining to product A based on, at least in part, user 46 being associated with the development team for product A (e.g., based on, at least in part, information included within an organizational document, such as an LDAP directory). Collision process 10 may utilized various additional/alternative techniques to determine subject matter knowledge of a call participant.

In another example embodiment, a moderator of the multi-party call (and/or another individual) may identify one or more participants of the multi-party call (e.g., during a call scheduling activity, call set-up or initiation activity, etc.) as being subject matter experts for the purpose of the multi-party call. In a similar manner, the one or more voice collision rules may be based on, at least in part, a designation (e.g., in a calendaring/scheduling invitation for the call, or the like) of one or more participants in the multi-party call as being essential or non-essential for the call. Consistent with the foregoing, in an embodiment the one or more voice collision rules may define speaking priority for the participants of the call based on, at least in part, relative knowledge of the speakers and/or based on, at least in part, whether the speaker is an essential participant for the call or a non-essential participant for the call.

In an example embodiment, the one or more voice collision rules may be based on, at least in part, a speaker history. For example, collision process 10 may identify the first speaker (e.g., user 46) as commonly interrupting and/or speaking over other call participants. For example, collision process 10 may determine that user 46 is involved in a relatively large number and/or high frequency of identified 100 voice collisions (e.g., as compared to an average number/frequency of voice collisions for other users). Additionally/alternatively, one or more specific users may be identified (e.g., by a system administrator, call moderator, or other individual) as being a frequent interrupter. Continuing with the above example, in an embodiment, the one or more voice collision rules may define a speaking priority user 48 relative to user 46, who may be determined to be a frequent interrupter.

Consistent with an example embodiment herein, the one or more voice collision rules may be based on, at least in part, a combination of one or more of organizational structure, subject matter knowledge, and speaker history. In further embodiments, the one or more voice collision rules may be prioritized. For example, in a voice collision event in which more than one of the voice collision rule may apply, one of the voice collision rules may control.

Collision process 10 may also determine 104 one of the first speaker and the second speaker to be a priority speaker based upon, at least in part, the one or more voice collision rules. For example, based on, at least in part, the one or more voice collision rules, collision process 10 may determine that one of the first speaker and the second speaker should be given priority, and, therefore, should be heard by the other call participants relative to the other speaker. Further, collision process 10 may further allocate 106 call bandwidth to the priority speaker. As such, the priority speaker may be heard by the other call participants during the voice collision, while the other speaker may not be heard (e.g., may be muted relative to the other call participants) during the voice collision.

In some embodiments, the one or more voice collision rules may define speaker priority, at least in part, with respect to one or more different call participant subsets. That is, the speakers involved in the voice collision may be given speaker priority relative to different call participant subsets. The call participant subset may include at least a portion of the call participants. In some embodiments, the call participant subset may include less than all of the call participants of the multi-party call. Consistent with such an embodiment, collision process 10 may determine 112 one of the first speaker and the second speaker as a priority speaker for a first call participant subset. Further, collision process 10 may allocate 114 call bandwidth to the priority speaker for the first call participant subset. In an embodiment, the first call participant subset may include less than all of the call participants. Accordingly, in an embodiment, collision process 10 may determine 112 the first speaker as a priority speaker for the first call participant subset, and may allocate 114 call bandwidth to the first speaker for the first call participant subset. Further, collision process 10 may determine 112 that the second speaker is a priority speaker for a second call participant subset, and may allocate 114 call bandwidth to the second speaker for the second call participant subset. In such an embodiment, the first call participant subset me hear the first speaker during the voice collision, and the second call participant subset may hear the second speaker during the voice collision.

While various embodiments and features have been described herein, it will be apparent to one having skill in the art that the various embodiments and features may be susceptible to combination with one another and/or to various additional/alternative combinations. All such combination of subject matter disclosed herein are intended to be contemplated by the present disclosure.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer-implemented method comprising:
   identifying, by a processor, a voice collision between a first speaker and a second speaker in a multi-party call;
   receiving, by the processor, one or more voice collision rules;
   determining, by the processor, one of the first speaker and the second speaker to be a priority speaker based upon, at least in part, the one or more voice collision rules; and
   allocating, by the processors, call bandwidth to the priority speaker, including allocating a first call bandwidth to the first speaker for a first call participant subset and a second call bandwidth to the second speaker for a second call participant subset, wherein participants included within the first call participant subset of the multi-party call receives audio for the first speaker during the voice collision and participants included within the second call participant subset of the multi-party call receives audio for the second speaker during the voice collision.

2. The computer-implemented method of claim 1, further including determining an identity of the first speaker and an identity of the second speaker.

3. The computer-implemented method of claim 1, wherein the one or more voice collision rules are based on, at least in part, an organizational structure.

4. The computer-implemented method of claim 1, wherein the one or more voice collision rules are based on, at least in part, speaker subject matter knowledge.

5. The computer-implemented method of claim 4, further including determining a topic associated with the multi-party call.

6. The computer-implemented method of claim 1, wherein the one or more voice collision rules are based on a speaker history.

7. The computer-implemented method of claim 1, wherein determining one of the first speaker and the second speaker as a priority speaker includes determining one of the first speaker and the second speaker as a priority speaker for the first call participant subset.

8. A computer program product comprising a non-transitory computer readable medium having a plurality of instructions stored thereon, which, when executed by a processor, cause the processor to perform operations comprising:
identifying a voice collision between a first speaker and a second speaker in a multi-party call;
receiving one or more voice collision rules;
determining one of the first speaker and the second speaker to be a priority speaker based upon, at least in part, the one or more voice collision rules; and
allocating call bandwidth to the priority speaker, including allocating a first call bandwidth to the first speaker for a first call participant subset and a second call bandwidth to the second speaker for a second call participant subset, wherein participants included within the first call participant subset of the multi-party call receives audio for the first speaker during the voice collision and participants included within the second call participant subset of the multi-party call receives audio for the second speaker during the voice collision.

9. The computer program product of claim 8, further including instructions for determining an identity of the first speaker and an identity of the second speaker.

10. The computer program product of claim 8, wherein the one or more voice collision rules are based on, at least in part, an organizational structure.

11. The computer program product of claim 8, wherein the one or more voice collision rules are based on, at least in part, speaker subject matter knowledge.

12. The computer program product of claim 11, further including instructions for determining a topic associated with the multi-party call.

13. The computer program product of claim 8, wherein the one or more voice collision rules are based on a speaker history.

14. The computer program product of claim 8, wherein the instructions for determining one of the first speaker and the second speaker as a priority speaker include instructions for determining one of the first speaker and the second speaker as a priority speaker for the first call participant subset.

15. A computing system comprising one or more processors, the one or more processors configured to:
identify a voice collision between a first speaker and a second speaker in a multi-party call;
receive one or more voice collision rules;
determine one of the first speaker and the second speaker to be a priority speaker based upon, at least in part, the one or more voice collision rules; and
allocate call bandwidth to the priority speaker, including allocating a first call bandwidth to the first speaker for a first call participant subset and a second call bandwidth to the second speaker for a second call participant subset, wherein participants included within the first call participant subset of the multi-party call receives audio for the first speaker during the voice collision and participants included within the second call participant subset of the multi-party call receives audio for the second speaker during the voice collision.

16. The computing system of claim 15, wherein the one or more processors are further configured to determine an identity of the first speaker and an identity of the second speaker.

17. The computing system of claim 15, wherein the one or more voice collision rules are based on, at least in part, an organizational structure.

18. The computing system of claim 15, wherein the one or more voice collision rules are based on, at least in part, speaker subject matter knowledge.

19. The computing system of claim 18, wherein the one or more processors are further configured to determine a topic associated with the multi-party call.

20. The computing system of claim 15, wherein the one or more voice collision rules are based on a speaker history.

21. The computing system of claim 15, wherein the one or more processors configured to determine one of the first speaker and the second speaker as a priority speaker are configured to determine one of the first speaker and the second speaker as a priority speaker for the first call participant subset.

* * * * *